(12) United States Patent
Sato et al.

(10) Patent No.: US 7,715,949 B2
(45) Date of Patent: May 11, 2010

(54) VIBRATION REDUCING DEVICE

(75) Inventors: Yusuke Sato, Yokosuka (JP); Yoshimi Nunome, Yokosuka (JP); Kazuhiro Fujikane, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 238 days.

(21) Appl. No.: 11/976,402

(22) Filed: Oct. 24, 2007

(65) Prior Publication Data

US 2008/0103628 A1 May 1, 2008

(30) Foreign Application Priority Data

Oct. 30, 2006 (JP) ............... 2006-294546
Jul. 25, 2007 (JP) ............... 2007-193112

(51) Int. Cl.
G06F 19/00 (2006.01)
G21C 17/00 (2006.01)
F16F 7/10 (2006.01)

(52) U.S. Cl. ............... 700/280; 702/183; 340/679; 188/378; 73/669

(58) Field of Classification Search ............... 700/275, 700/280; 702/183; 340/679; 73/669; 188/378
See application file for complete search history.

(56) References Cited

U.S. PATENT DOCUMENTS 5,540,099 A * 7/1996 Harashima ............... 73/669
5,861,725 A * 1/1999 Endo et al. ............... 318/434
6,296,093 B1 * 10/2001 Norris et al. ............... 188/378
6,460,803 B1 * 10/2002 Kiss et al. ............... 244/54
6,745,084 B2 * 6/2004 Boger et al. ............... 700/13
7,184,930 B2 * 2/2007 Miyasaka et al. ............... 702/183
7,523,603 B2 * 4/2009 Hagen et al. ............... 60/39.55
2007/0118333 A1 * 5/2007 Miyasaka et al. ............... 702/183

FOREIGN PATENT DOCUMENTS

JP 8-200179 8/1996

* cited by examiner

*Primary Examiner*—Ramesh B Patel
*Assistant Examiner*—Douglas S Lee
(74) *Attorney, Agent, or Firm*—Drinker Biddle & Reath LLP

(57) ABSTRACT

A vibration reducing device that reduces the vibration of a control object includes a digital controller. A vibration state detection device detects the vibration of the control object and generates an analog signal of the vibration of the control object. An input-side bandpass filter has a passband that is narrower than a frequency range from a Nyquist frequency to a sampling frequency of the digital controller, and that contains no frequencies that are an integer multiple of the Nyquist frequency of the digital controller. The input-side bandpass filter allows a part of the analog signal that falls within the passband from the analog signal generated by the vibration state detection device to pass. An A/D conversion device converts the analog signal that has passed through the input-side bandpass filter into a digital signal. A D/A conversion device converts a digital feedback control signal, determined by the digital controller on the basis of the digital signal converted by the A/D conversion device, into an analog feedback control signal. An actuator applies vibration to the control object on the basis of the analog feedback control signal converted by the D/A conversion device.

18 Claims, 10 Drawing Sheets

VIBRATION REDUCING DEVICE

CROSS-REFERENCE TO RELATED APPLICATIONS

This application claims priority under 35 U.S.C. §119 to Japanese Patent Application Nos. 2006-294546, filed on Oct. 30, 2006, and 2007-193112 filed Jul. 25, 2007, the disclosures of which are incorporated by reference herein in the entirety.

BACKGROUND OF THE INVENTION

1. Field of the Invention

The present invention relates to a device for reducing the vibration of a control object, which can be applied to reduce the high-frequency vibration of the control object. A fuel injector of an internal combustion engine is one such control object that has a high-frequency vibration to be reduced.

2. Description of Related Art

In a direct-injection diesel engine, fuel that has been compressed to a high pressure is directly sprayed into the cylinders by fuel injectors. The fuel injectors may be supported, for example, by known structures. That is, the fuel injector may be installed in a fuel injector mounting hole formed in the cylinder head, and pressed and fixed in the cylinder head by a nozzle support. The nozzle support includes a forked part that terminates in two prongs, is placed over the fuel injector, is supported on the head main body at a supporting point on the opposite end, and is fastened with a bolt on the cylinder head. The axial force of the bolt is transferred to the forked part of the nozzle support, and the fuel injector is pressed and fixed on the cylinder.

The fuel injector includes a needle valve and other moving elements. The lifting/retraction of the needle valve against the seat, controls the injection of fuel. The opening and closing of the needle valve in the fuel injector generates an impact force due to collision. Specifically, in a common rail type diesel engine, as the internal elements of the fuel injector are driven by the high-pressure fuel, the impact force generated in the fuel injector is high. As the fuel injector vibrates due to the impact force, the vibration is transmitted via the nozzle support and cylinder head connected to the fuel injector, to other parts of the engine, which are main factors contributing to engine noise.

BRIEF SUMMARY OF THE INVENTION

The present inventors have proposed the following arrangement: an actuator prepared by laminating thin sheet-shaped piezoelectric elements that stretch in the axial direction corresponding to an applied voltage is arranged between the cylinder head seat surface and the fuel injector, and by feeding back the acceleration in the axial direction of the fuel injector, the vibration of the fuel injector is reduced. However, for a digital controller, when the original signal contains high-frequency components that exceed one-half of the sampling frequency (i.e. the Nyquist frequency), the high-frequency components are folded at the Nyquist frequency and are superimposed on the original signal, generating an error known as aliasing (i.e. folding noise). In order to prevent aliasing, usually the high-frequency components that exceed the Nyquist frequency are eliminated with a low-pass filter (i.e. high-cut filter).

In the related art, when the frequency region associated with the control object contains high frequencies, it is necessary to use a high-speed digital controller that allows an increased sampling frequency and Nyquist frequency, and an expanded frequency bandwidth free of aliasing errors. However, these types of digital controllers are costly.

An object of the present invention is to solve the aforementioned problems of the related art by providing a vibration reducing device that can execute control without generating error for the high frequency region above the Nyquist frequency of the digital controller.

In an embodiment, a vibration reducing device that reduces the vibration of a control object is provided. The vibration reducing device includes a digital controller. A vibration state detection device connected with the digital controller detects the vibration of the control object and generates an analog signal of the vibration of the control object. An input-side bandpass filter connected with the vibration state detection device has a passband that is narrower than a frequency range from a Nyquist frequency to a sampling frequency of the digital controller, and that contains no frequencies that are an integer multiple of the Nyquist frequency of the digital controller. The input-side bandpass filter allows a part of the analog signal that falls within the passband from the analog signal generated by the vibration state detection device to pass. An A/D conversion device arranged between the input-side bandpass filter and the digital controller converts the analog signal that has passed through the input-side bandpass filter into a digital signal. A D/A conversion device connected with the digital controller converts a digital feedback control signal, determined by the digital controller on the basis of the digital signal converted by the A/D conversion device, into an analog feedback control signal. An actuator connected with the digital controller through the D/A conversion device applies vibration to the control object on the basis of the analog feedback control signal converted by the D/A conversion device.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Embodiment 1

Figure 1:
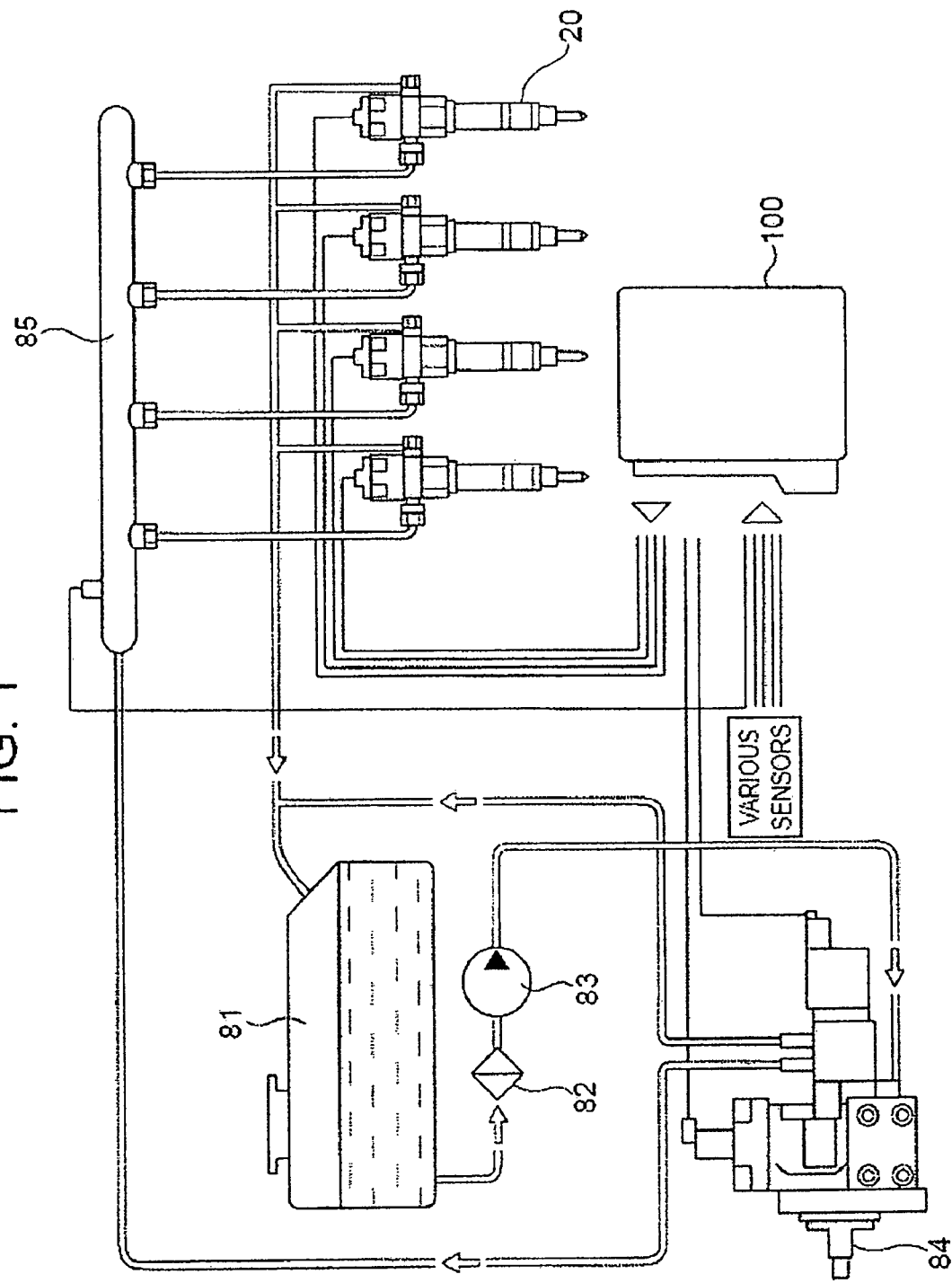
FIG. 1 is a diagram illustrating the fuel supply system using the fuel injector vibration reducing device according to an embodiment of the present invention.

FIG. 1 is a diagram illustrating a fuel supply system with fuel injectors to which the vibration reducing device of the present invention has been applied. This fuel supply system shown is used in common rail type diesel engines for automobiles.

The fuel in fuel tank 81 is pumped out with low pressure pump 83 via filter 82, compressed to a high pressure state by high-pressure supply pump 84, and fed to common rail 85. High-pressure supply pump 84 contains a pressure regulator. As a result, the excess fuel is returned to fuel tank 81, and the pressure in common rail 85 is controlled to the prescribed level. The high-pressure fuel is fed from common rail 85 to each fuel injector 20, and as fuel injector 20 is driven to open the valve, the fuel is directly sprayed into each cylinder.

The operation of fuel injector 20 is controlled by controller 100. The controller 100 computes the fuel injection time and fuel injection quantity on the basis of the load on the engine (via e.g. the displacement of the accelerator pedal, etc.) and the engine rpm, and outputs a corresponding valve-opening instruction signal to fuel injector 20. Also, on the basis of the load on the engine and the engine rpm, controller 100 computes the fuel injection pressure, and controls the pressure regulator of high-pressure supply pump 84 so that the fuel in common rail 85 is at the computed fuel injection pressure. Controller 100 is a microcomputer with a central processing unit (CPU), read-only memory (ROM), random-access memory (RAM) and an input/output interface (I/O interface). Controller 100 may also be made up of plural microcomputers.

Figure 2:
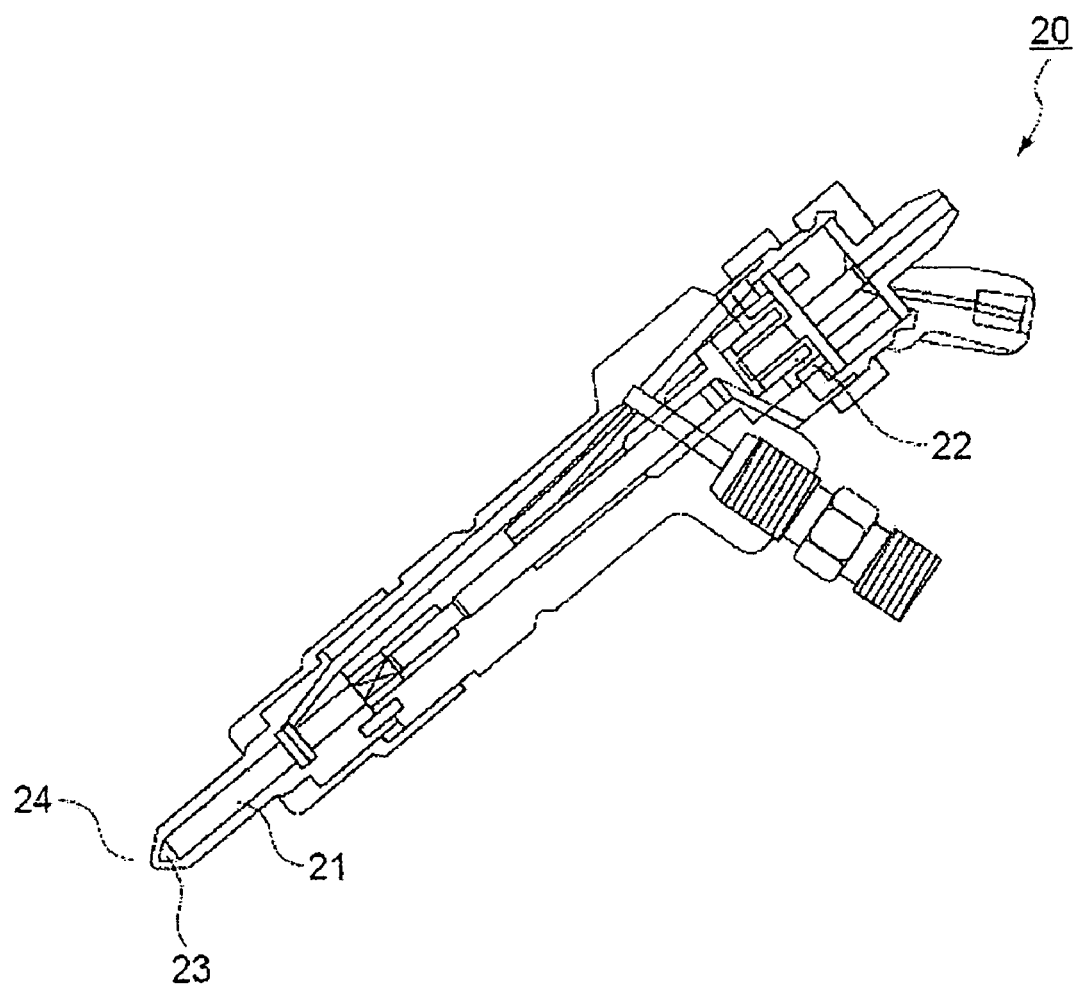
FIG. 2 is a diagram illustrating the structure of a fuel injector.

According to the present invention, the vibration of each fuel injector can be reduced. The cause of the generation of vibrations in the fuel injector is as follows. FIG. 2 is a diagram illustrating the structure of the fuel injector. Fuel injector 20 contains needle valve 21, above which is a combustion pressure chamber and below which is a fuel injection chamber.

When solenoid 22 of fuel injector 20 is closed, needle valve 21 presses against seat 23 due to the pressure in the combustion pressure chamber, so that no fuel is sprayed. Then, the controller instructs solenoid 22 of fuel injector 20 to open, which opens the combustion pressure chamber, causing the pressure in the combustion pressure chamber to fall. As a result, the pressure of the fuel injection chamber drives needle valve 21 up, so that injection hole 24 opens, spraying the fuel. Then, the controller instructs solenoid 22 of fuel injector 20 to close, so that the pressure in the combustion pressure chamber recovers and needle valve 21 is driven down such that needle valve 21 is seated on seat 23, and the fuel injection process comes to an end. The collision of needle valve 21 against seat 23 produces vibrations. Particularly in the fuel injection system using a common rail, since the combustion pressure is very high, a high impact force takes place, causing strong vibrations in fuel injector 20.

Figure 3:
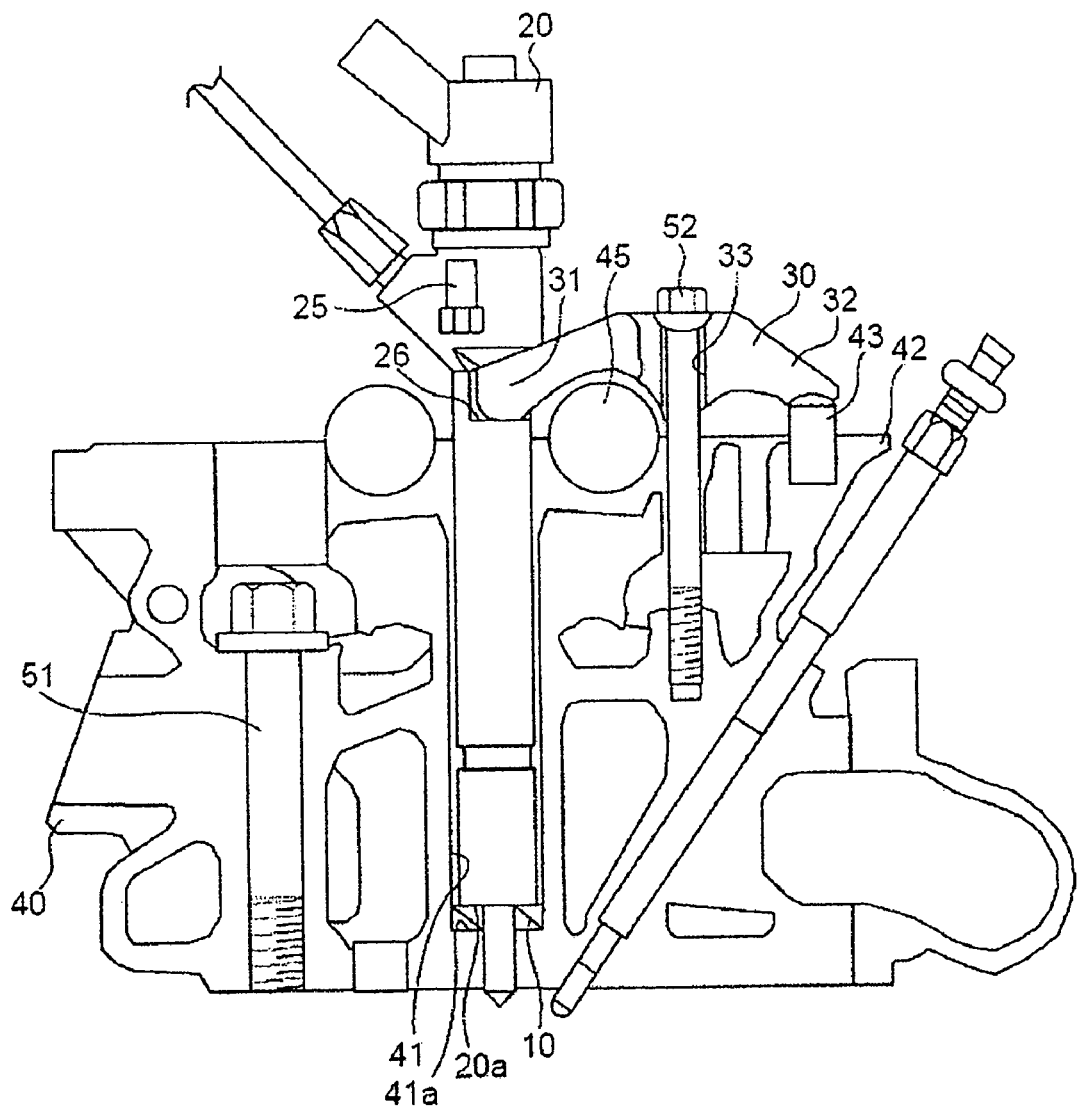
FIG. 3 is a cross-sectional view illustrating the cylinder head where the fuel injectors are installed, as seen from the front of the engine (in the crankshaft direction)

FIG. 3 is a cross-sectional view of cylinder head 40 in which fuel injector 20 is installed as seen from the front of the engine (i.e. in the direction of the crankshaft). Here, cylinder head 40 is fixed to the cylinder block by head bolt 51. In FIG. 3, however, the cylinder block is not shown.

Fuel injector 20 is installed and fixed in fuel injector mounting hole 41 formed on cylinder head 40, and is pressed and fixed by nozzle support 30 on cylinder head 40.

Bolt through-hole 33 is formed on nozzle support 30. Two-prong forked part 31 that spans camshaft 45 is formed at one end of nozzle support 30. Two-prong forked part 31 is in contact with pressure-receiving portion 26 of fuel injector 20. The other end 32 of nozzle support 30 is in contact with pivot pin 43, which can pivot (i.e. tilt) freely, embedded near side wall 42 of cylinder head 40. Bolt 52 is inserted in bolt through-hole 33 of nozzle support 30, and since it is screwed into cylinder head 40, the axial force of bolt 52 presses fuel injector 20 against cylinder head 40.

In this manner, since fuel injector 20 is installed on cylinder head 40, the vibration generated by the fuel injector is transmitted from lower surface 20a of fuel injector 20 via cylinder head seating surface 41a to cylinder head 40, and, at the same time, it is transferred via pressure receiving portion 26 to nozzle support 30, and then from pivot pin 43 and bolt 52 to cylinder head 40. The vibration is further transmitted to the cylinder block, head cover, etc., generating noise.

According to an embodiment of the present invention, actuator 10, constituted by a piezoelectric element, is used to reduce the noise. Actuator 10 is placed on cylinder head seating surface 41a of fuel injector mounting hole 41. Fuel injector 20 is placed on actuator 10. That is, actuator 10 is arranged between cylinder head seating surface 41a and fuel injector 20. Actuator 10 is prepared by laminating thin sheet-shaped piezoelectric elements, and stretches in the axial direction of the fuel injector corresponding to an applied voltage.

Acceleration sensor 25 for detecting the acceleration of the fuel injector 20 in the axial direction is attached to fuel injector 20.

According to the present invention, the acceleration of fuel injector 20 in the axial direction detected by acceleration sensor 25 is integrated to determine the vibrational velocity, which is then multiplied by the gain to obtain a force generated by actuator 10 under the velocity feedback control, which reduces the vibration caused by the impact of fuel injector 20. The generation of a force proportional to the velocity by actuator 10 provides an increase in the damping of the injector vibration system. As a result, it is possible to reduce the vibration near the resonance frequency of the vibration system. Consequently, the vibration excited in the cylinder block, head cover, etc. via cylinder head 40 is also reduced, so that the noise can be reduced.

Figure 4:
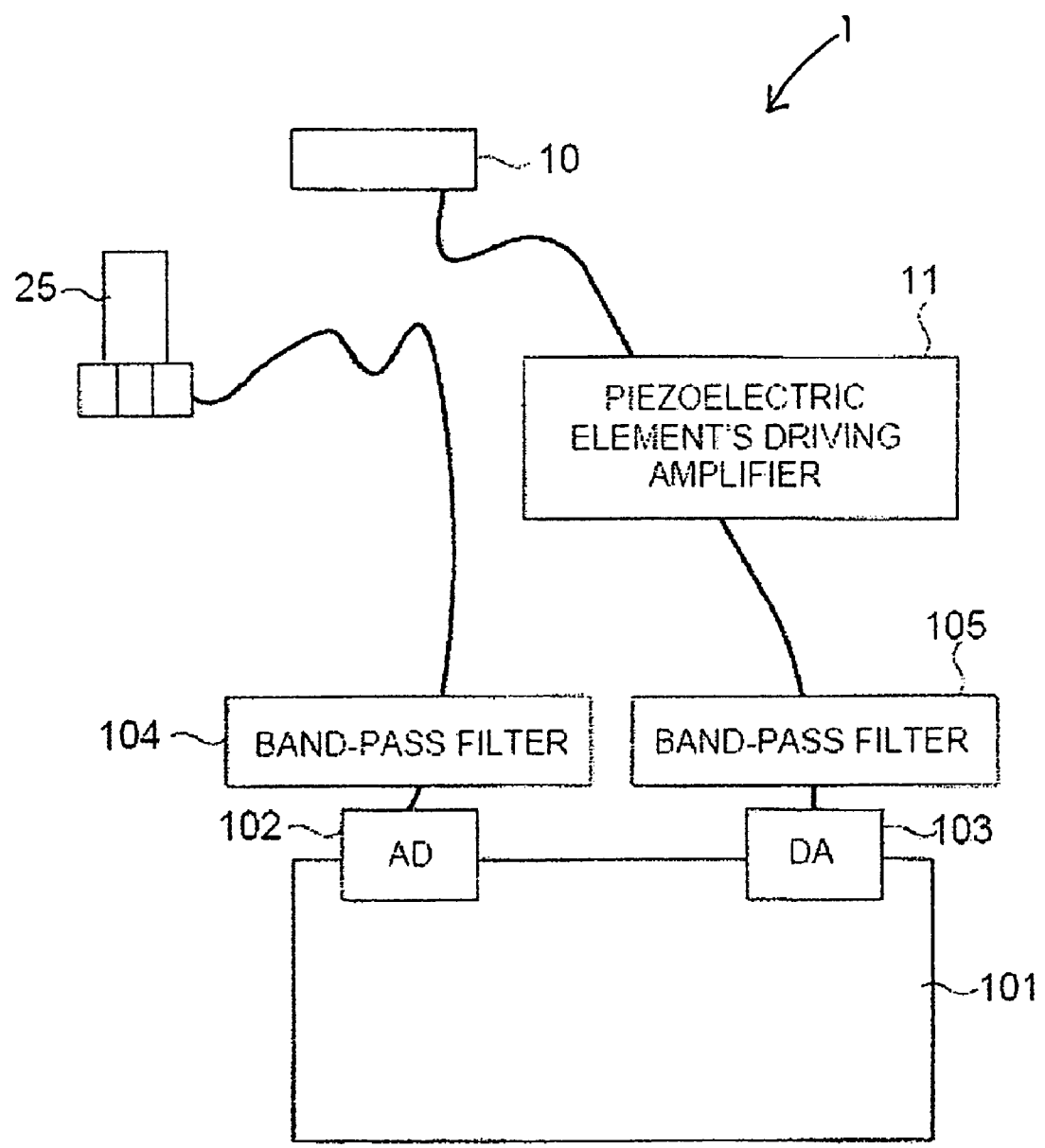
FIG. 4 is a diagram illustrating the a part of the fuel injector vibration reducing device according to an embodiment of the present invention.

FIG. 4 is a diagram illustrating a part of the vibration reducing device of the fuel injector according to the present invention. Vibration reducing device 1 of the fuel injector includes the following parts: piezoelectric element 10, piezoelectric element driving amplifier 11, acceleration sensor 25, digital controller 101 having a model computing part, A/D conversion part 102, D/A conversion part 103, input-side bandpass filter 104, and output-side bandpass filter 105.

Acceleration sensor 25 detects the acceleration of fuel injector 20 in the axial direction and generates an analog signal as a detection signal. The detection signal of acceleration sensor 25 is sent to the input-side bandpass filter 104. Input-side bandpass filter 104 is a bandpass filter with a passband that is narrower than the frequency range from the Nyquist frequency fn to the sampling frequency fs of the digital controller, and that contains no frequencies that are an integer multiple of the Nyquist frequency fn of the digital controller. Input-side bandpass filter 104 allows the analog signal of the vibration that falls within the passband from the vibration detected by acceleration sensor 25 to pass. Also, the filter has a roll-off, and the frequency regions with high reliability are the frequency regions of 1.1-1.85 times, 2.1-2.85 times, . . . the Nyquist frequency fn. The signal that has passed through the input-side bandpass filter 104 is sent to A/D conversion part 102.

A/D conversion part 102 converts analog signals into digital signals for input (e.g. sampling). Digital controller 101 sets the feedback control signal. The specific scheme in constructing digital controller 101 will be explained further below. D/A conversion part 103 converts the feedback control signal of digital controller 101 from a digital signal into an analog signal. Output-side bandpass filter 105 allows only signals whose frequencies lie within a prescribed band from the signals output from D/A conversion part 103 to pass. The prescribed band of the output-side bandpass filter 105 is narrower than a frequency range from a Nyquist frequency to a sampling frequency of the digital controller, and contains no frequencies that are an integer multiple of the Nyquist frequency of the digital controller. Piezoelectric element driving amplifier 11 outputs a voltage for driving piezoelectric element 10 on the basis of the signals that have passed through output-side bandpass filter 105. Piezoelectric element 10 stretches in the axial direction corresponding to the applied voltage.

Figure 5:
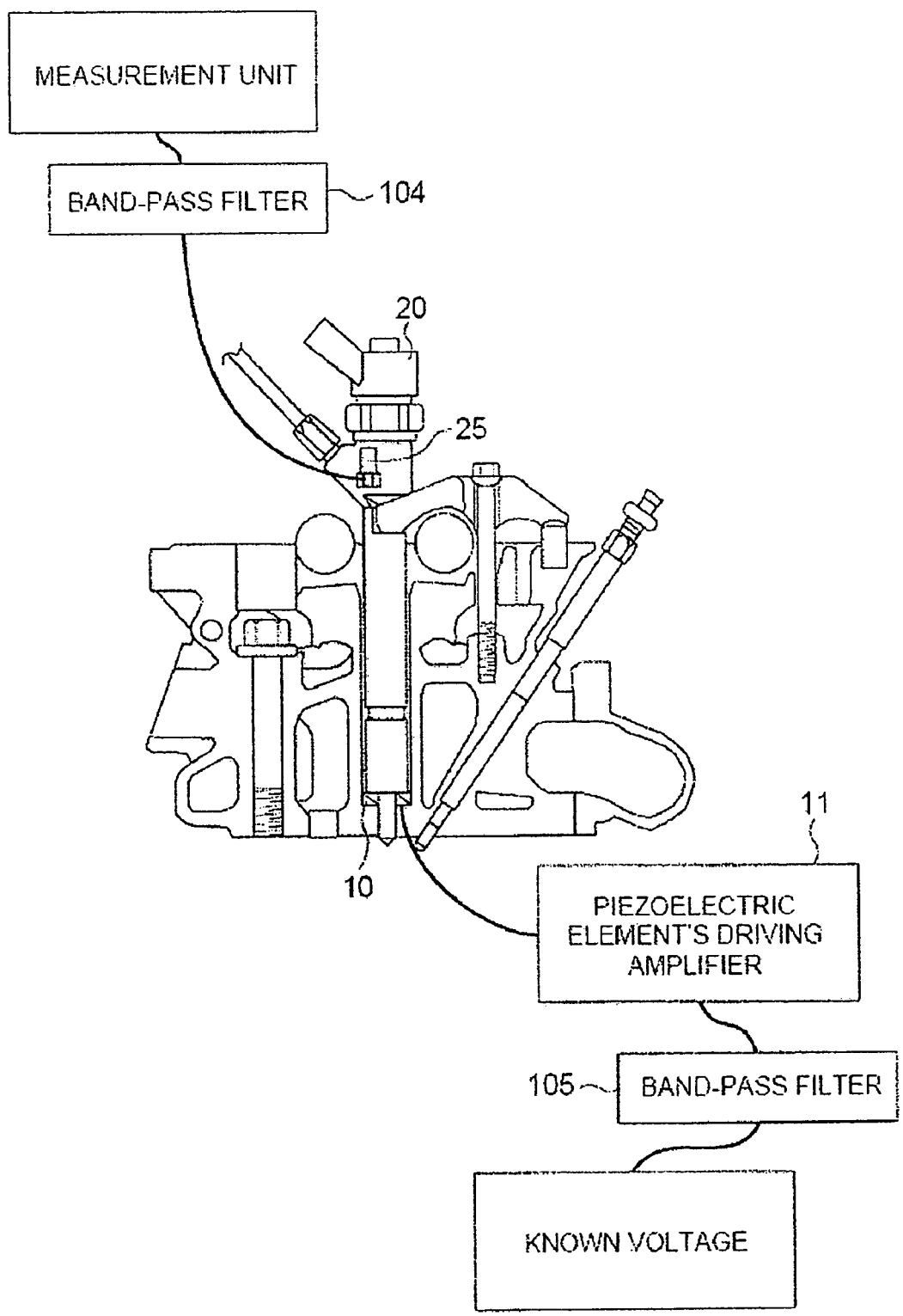
FIG. 5 is a diagram illustrating a method for constructing a digital controller.

FIG. 5 is a diagram illustrating the method for constructing the digital controller. First, the design of the control system requires that a physical model of the fuel injectors, bandpass filter, and piezoelectric element driving amplifier be constructed. For this purpose, a known voltage u(t) is applied to output-side bandpass filter 105 shown in FIG. 5 to drive piezoelectric element 10. As a result, the generated vibration signal passes input-side bandpass filter 104, and output voltage y(t) is measured.

The frequency spectrum of the known voltage u(t) and output voltage y(t) of input-side bandpass filter 104 are analyzed, and the obtained output voltage Y(S) of input-side bandpass filter 104 is divided by known voltage U(s) obtained by frequency analysis to obtain frequency characteristic $H_{acc}(s)$ expressed by Equation (1.1) below. Here, $[a_{acc1}, a_{acc2}, \ldots, a_{accm}], [b_{acc1}, b_{acc2}, \ldots, b_{accm}]$ of Equation (1.1) are determined by using the least squares method so as to be in approximate agreement with frequency characteristic $H_{acc}(S)$.

Equation 1.1

$$H_{acc}(s) = \frac{Y(s)}{U(s)} = \frac{a_{acc1} + a_{acc2} + \ldots + a_{accm}s^{m-1}}{b_{acc1} + b_{acc2} + \ldots + b_{accm}s^{m-1}} \quad (1.1)$$

This frequency characteristic can be converted into the following state equation, Equation (1.2).

Equation 1.2

$$\begin{cases} x(t) = A_a x(t) + B_a u(t) \\ y(t) = C_a x(t) + D_a u(t) \end{cases} \quad (1.2)$$

The physical model represented by Equation (1.2) is converted by sampling frequency fs into a discrete time physical model as represented by discrete time equation, Equation (1.3).

Equation 1.3

$$\begin{cases} x[k+1] = A_d x[k] + B_d u[k] \\ y[k] = C_d x[k] + D_d u[k] \end{cases} \quad (1.3)$$

$$A_d = e^{A_a \Delta t}, B_d = B_a \int_0^{\Delta t} e^{A_a \tau} d\tau, C_d = C_a, D_d = D_a$$

Digital controller 101 uses this discrete time physical model to determine the feedback control signal.

FIG. 6 is a diagram illustrating the signal processing for the fuel injector vibration reducing device of the present invention.

Figure 6A:
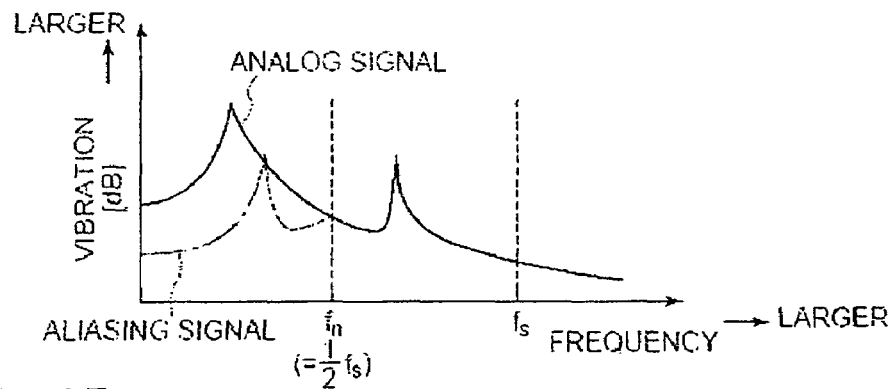
FIG. 6 is a diagram illustrating signal processing of the fuel injector vibration reducing device according to an embodiment of the present invention.

Usually, as shown in FIG. 6(A), for a digital controller, when the original signal contains high frequency components that exceed half the sampling frequency fs (Nyquist frequency fn), the high-frequency components are folded at the Nyquist frequency fn and are superimposed on the original signal, leading to an error called aliasing (i.e. folding noise).

In the related art, usually, the high frequency components that exceed the Nyquist frequency fn are cut off by a low-pass filter (i.e. high-cut filter). However, with this method, when the frequency region associated with the control object is high, a high-speed controller that allows an increased sampling frequency fs, so that the Nyquist frequency fn can be raised, and an expanded frequency bandwidth so that the aliasing errors can be avoided, is used. In this case however, an expensive controller is required.

Figure 6B:
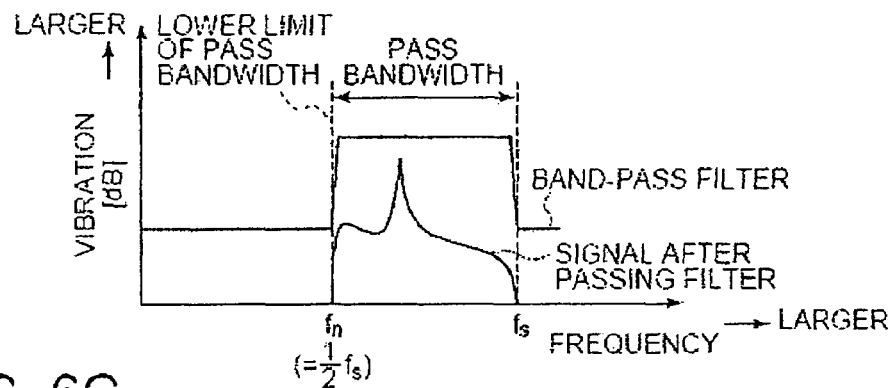

The present inventors proposed a vibration reducing device 1 for a fuel injector as shown in FIG. 4. With the device, after the signal (i.e. original signal) detected by acceleration sensor 25 passes through input-side bandpass filter 104, the signal has only the prescribed frequency band, as shown in FIG. 6(B).

Figure 6C:
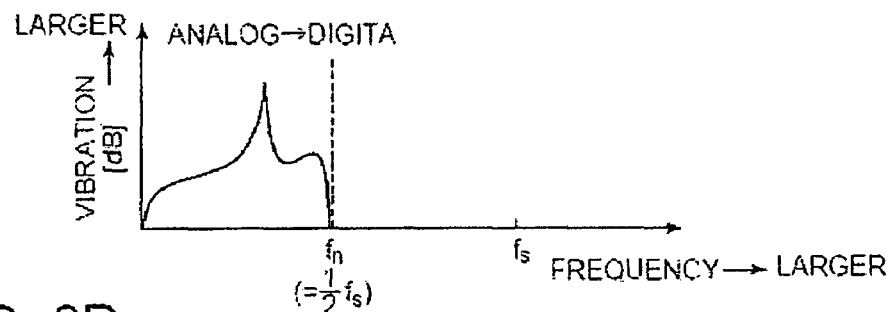

When the signal that has passed through input-side bandpass filter 104 is output from A/D conversion part 102 to digital controller 101, as shown in FIG. 6(C), the signal is folded at Nyquist frequency fn.

Digital controller 101 determines the feedback control signal from the input signal on the basis of the $H^{\infty}$ (H infinite) control theory (H-infinity control theory).

Figure 6D:
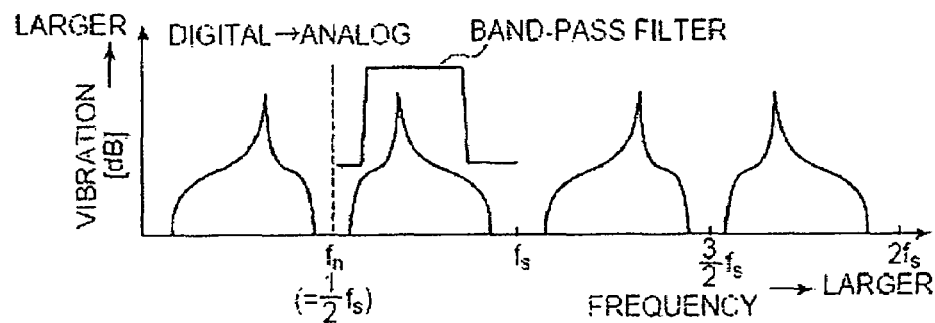

After the feedback control signal has passed through D/A conversion part 103, as shown in FIG. 6(D), the signal is folded at Nyquist frequency fn and then folded again at sampling frequency fs, and then, . . . , it is thus folded repeatedly. Here, the signal passes output-side bandpass filter 105, and the signal with the necessary frequency bandwidth is output.

This signal is amplified by piezoelectric element driving amplifier 11, and piezoelectric element 10 is controlled so that the vibration component corresponding to the detected frequency is reduced.

Figure 7:
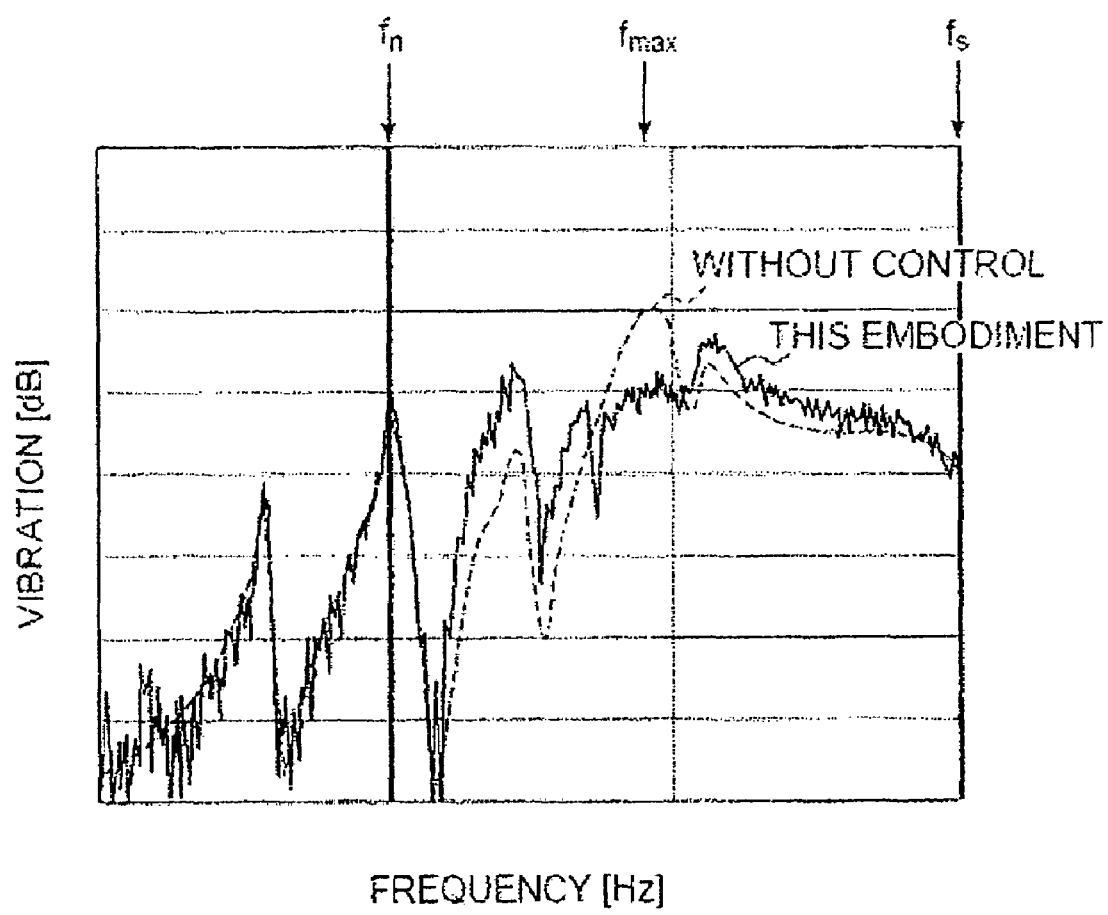
FIG. 7 is a diagram illustrating the effect when the fuel injector vibration reducing device is in use.

FIG. 7 is a diagram illustrating the effect when the fuel injector vibration reducing device of the present embodiment is in use.

According to the present embodiment, as shown in FIG. 7, it is possible to reduce the vibration level in the frequency bandwidth above Nyquist frequency fn. Specifically, it is possible to reduce the vibration level at frequency fmax with the maximum vibration level.

Embodiment 2

Figure 8:
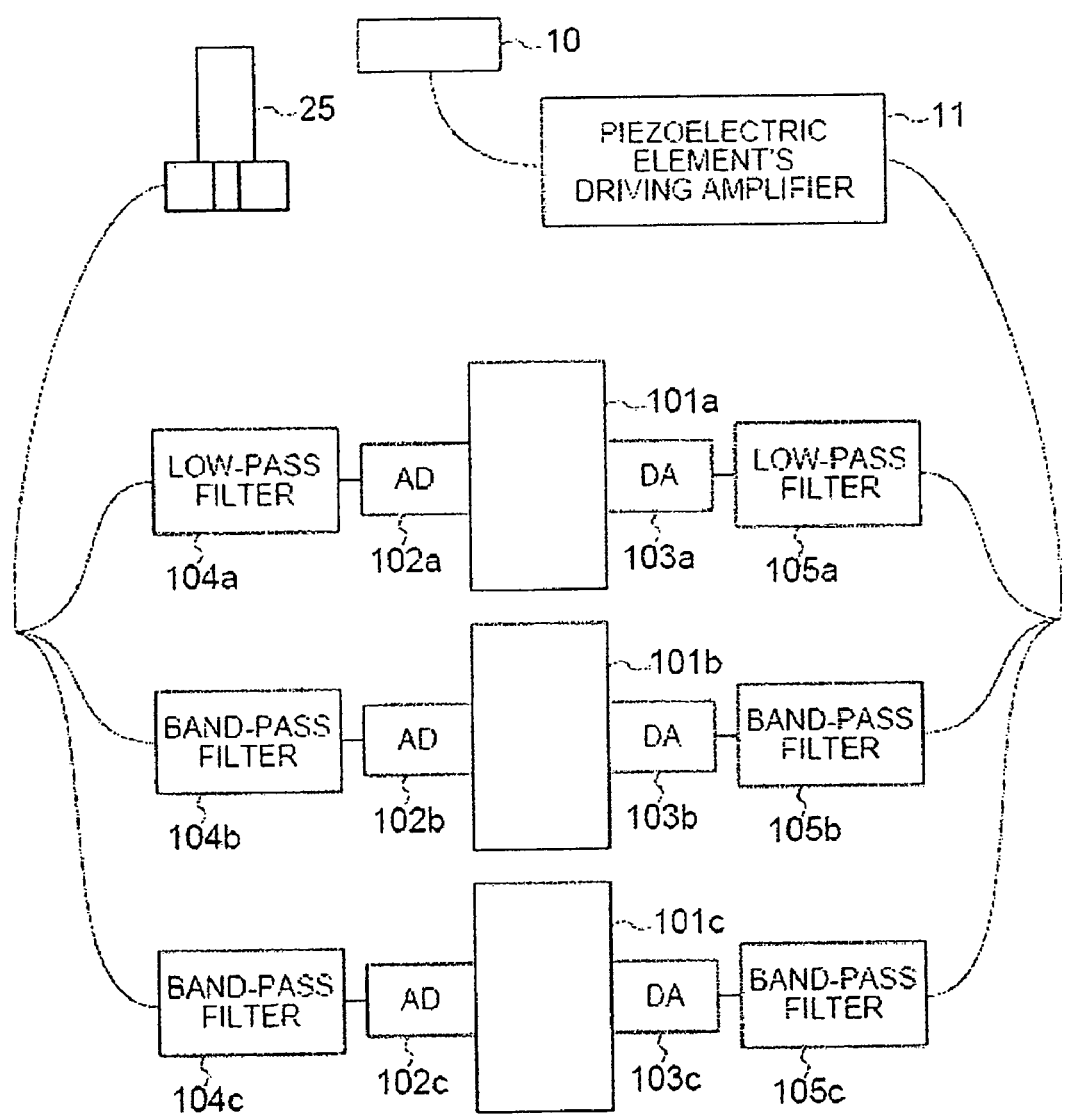
FIG. 8 is a diagram illustrating another embodiment of the fuel injector vibration reducing device of the present invention.

FIG. 8 is a diagram illustrating another embodiment of the fuel injector vibration reducing device of the present invention. The same part numbers that were used in the aforementioned embodiment are used again here; their detailed explanation will not be repeated.

Input-side bandpass filter 104c, A/D conversion part 102c, digital controller 101c, D/A conversion part 103c, and bandpass filter 105c substantially corresponds to those having same part number in the aforementioned embodiment. On the other hand, input-side bandpass filter 104b, A/D conversion part 102b, digital controller 101b, D/A conversion part 103b, and output-side bandpass filter 105b are added as additional elements of the vibration reducing device. The digital controller 101b is connected with the acceleration sensor 25 (vibration state detection device) and the piezoelectric element 10 (the actuator) as a second digital controller. The input-side bandpass filter 104b arranged between the acceleration sensor 25 and the digital controller 101b as a second input-side bandpass filter. The input-side bandpass filter 104b has a passband that is narrower than a frequency range from a Nyquist frequency to a sampling frequency of the digital controller 101b, and contains no frequencies that are an integer multiple of the Nyquist frequency of the digital controller 101b. The input-side bandpass filter 104b allows a part of the analog signal that falls within the passband of the input-side bandpass filter 104b from the analog signal generated by the acceleration sensor 25 to pass. The analog signal that has passed the input-side bandpass filter 104b is converted into a digital signal by the A/D conversion part 102b. The digital feedback control signal is determined by the digital controller 101b on the basis of the digital signal converted by the A/D-conversion part 102b. The digital feedback control signal determined by the digital controller 101b is converted into a analog feedback control signal by the D/A conversion part 103b. The output-side bandpass filter 105b arranged between the digital controller 101b and piezoelectric element 10 as a second output-side bandpass filter. The output-side bandpass filter 105b has a passband that is narrower than a frequency range from a Nyquist frequency to a sampling frequency of the digital controller 101b, and contains no frequencies that are an integer multiple of the Nyquist frequency of the digital controller 101b. The output-side bandpass filter 105b allows a part of the analog feedback control signal that falls within the passband of the output-side bandpass filter 105b from the analog feedback control signal converted by the D/A conversion part 103b to pass. The piezoelectric element 10 apply a vibration to the control object (fuel injector) on the basis of the analog feedback control signal that has passed the output-side bandpass filter 105b.

A low frequency bandwidth control part is also connected with the acceleration sensor 25 and the piezoelectric element 10. The low frequency bandwidth control part can contain input-side low-pass filter 104a, A/D conversion part 102a, digital controller 101a, D/A conversion part 103a, and output-side low-pass filter 105a. The input-side low-pass filter 104a allows a part of the analog signal having frequencies below the Nyquist frequency of the digital controller 101a from the analog signal generated by the acceleration sensor 25 to pass. The A/D conversion part 102a converts the analog signal that has passed through the input-side low-pass filter 104a into a low-side digital signal. The digital controller 101a determines a low-side digital feedback control signal on the basis of the low-side digital signal. D/A conversion part 103a converts a low-side digital feedback control signal into a low-side analog feedback control signal. The output-side low-pass filter 105a allows a part of the analog feedback control signal having frequencies below the Nyquist frequency of the digital controller 101a from the analog feedback control signal converted by the D/A conversion part 103a to pass. The piezoelectric element 10 applies vibration to the control object (fuel injector) on the basis of the low-side analog feedback control signal.

In embodiment 1, a bandpass filter is used. However, the bandpass filter has a roll-off, and the control precision may be poor at the end of the passband. Also, the frequency region may be limited by the bandpass filter, so that the controllable frequency bandwidth becomes narrower. For example, control cannot be performed near low frequencies in the vicinity of 0 Hz.

For the device in the present embodiment, three frequency band control parts (low-frequency band control part, intermediate frequency band control part and high-frequency band control part) are used so as to expand the frequency band that can be controlled. Also, by using a low-pass filter in the low frequency band control part, it is possible to control the low frequency region near 0 Hz. In addition, by overlapping the passbands of the bandpass filters used in the intermediate frequency band control part and high frequency band control part, it is possible to ensure that there is no deterioration of the control precision even at the ends of the passband.

Figure 9:
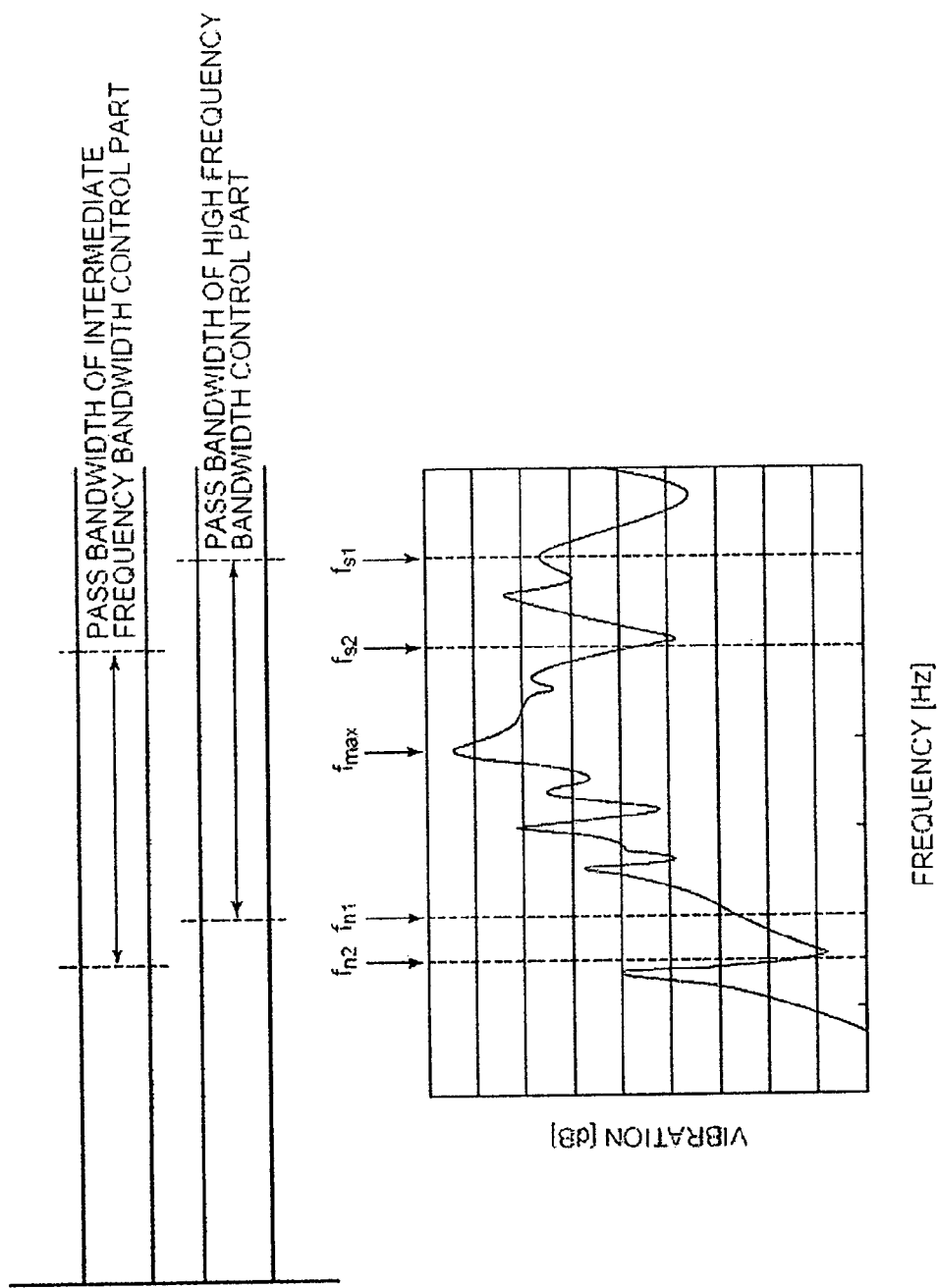
FIG. 9 is a diagram illustrating the passband of the intermediate frequency band control part and the high-frequency band control part.

The cutoff frequency of low-pass filters 104a, 105a of digital controller 101a for the low-frequency band control is fn1, and it is equal to the Nyquist frequency of digital controller 101a. As shown in FIG. 9, the passbands of bandpass filters 104b, 105b of digital controller 101b for the intermediate frequency bandwidth control are fn2-fs2. The input-side bandpass filter 104b is a bandpass filter which has a passband that is narrower than the frequency range from the Nyquist frequency f'n to the sampling frequency f's and that contains no frequencies that are an integer multiple of the Nyquist frequency f'n of digital controller 101b. Also, as shown in FIG. 9, the passbands of bandpass filters 104c, 105c of digital controller 101c for the high-frequency band control are fn1-fs1. Input-side bandpass filter 104c is a bandpass filter which has a passband that is narrower than the frequency range from the Nyquist frequency f"n to the sampling frequency f"s and that contains no frequencies that are an integer multiple of the Nyquist frequency f"n of digital controller 101c. Frequencies fn1-fs2 overlap.

The control precision of digital controller 101b deteriorates near end frequencies fn2, fs2 of the passbands of the bandpass filters 104b, 105b. Also, the control precision of digital controller 101c deteriorates near end frequencies fn1, fs1 of the passbands of bandpass filters 104c, 105c.

However, in the present embodiment, since plural bandpass filters are used, correct control can be performed even near fn1 and fn2.

In this manner, by using a combination of plural controllers (e.g. bandpass filters), it is possible to perform correct control over a wide frequency band by using an inexpensive controller that uses a low sampling frequency (corresponding to digital controller 101c in the present application example) without resorting to an expensive controller that uses a high sampling frequency (controller having a sampling frequency higher than the sampling frequency of digital controller 101c) and without decreasing the control precision (by using digital controller 101b) at the ends of the passband (in this application example, near the Nyquist frequency of digital controller 101c).

Figure 10:
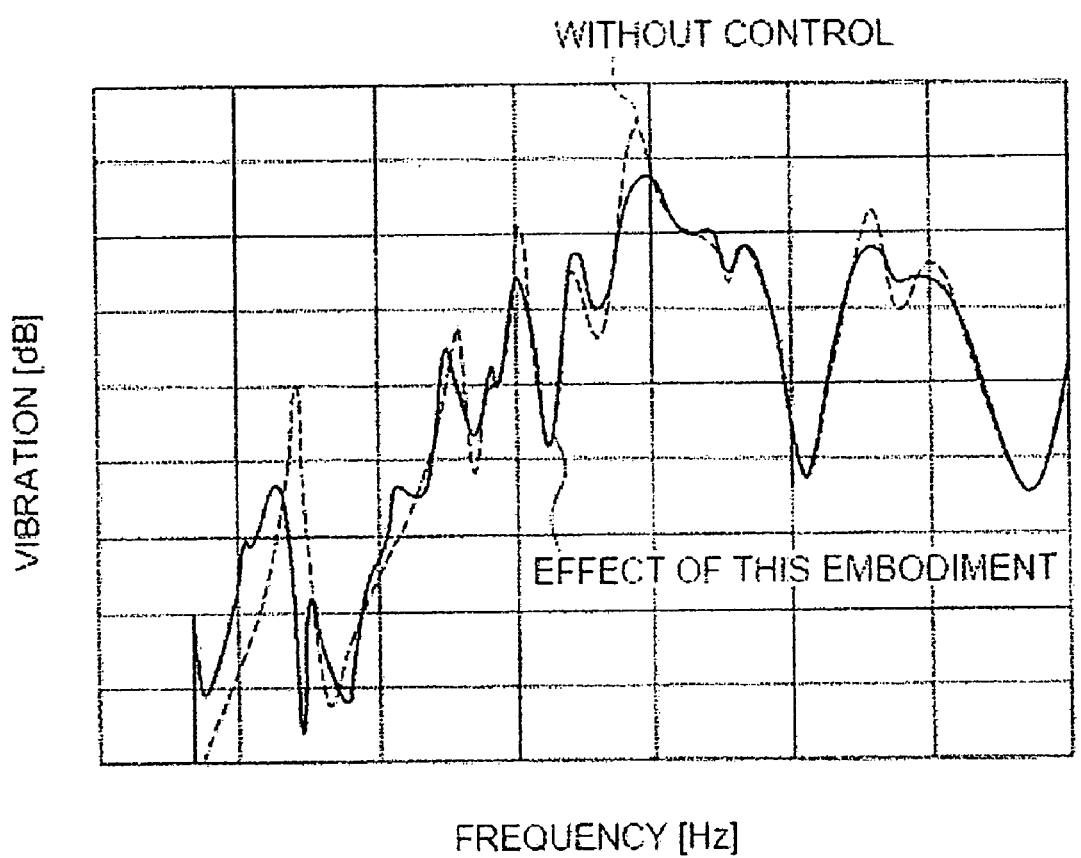
FIG. 10 is a diagram illustrating the effect of the embodiment of FIG. 8.

In this manner, according to the present embodiment, as shown in FIG. 10, it is possible to reduce the vibration level especially at frequency fmax where maximum vibration occurs. Also, since digital controller 101a has a low-pass filter, it is possible to execute control over a wide frequency region starting at close to 0 Hz, and it is possible to reduce the vibration of the fuel injector over a wide rpm range, from low engine rpm to high rpm. In addition, since the passbands of the bandpass filters used in digital controller 101b and digital controller 101c overlap, there is no deterioration in the control precision even at the ends of the passband.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A vibration reducing device that reduces the vibration of a control object by a digital controller, the vibration reducing device comprising:
    a vibration state detection device that detects the vibration of the control object;
    an input-side bandpass filter, which has a passband that is narrower than a frequency range from a Nyquist frequency of the digital controller to a sampling frequency, and that contains no frequencies that are an integer multiple of the Nyquist frequency of the digital controller, and which allows the vibration that falls within the passband from the vibration detected by the vibration state detection device to pass;
    an A/D conversion device that converts the analog signal that has passed through input-side bandpass filter into a digital signal;
    a D/A conversion device that converts a feedback control signal, determined by the digital controller on the basis of the digital signal converted by the A/D conversion device, from a digital signal into an analog signal; and
    an actuator that applies vibration to the control object on the basis of the analog signal converted by the D/A conversion device.

2. The vibration reducing device according to claim 1, wherein the control object is a fuel injector of an internal combustion engine, and wherein the frequencies of the vibration peaks of the fuel injector fall within the passband of the input-side bandpass filter.

3. The vibration reducing device according to claim 1, wherein the vibration state detection device detects one or more of the acceleration, velocity, displacement and sound pressure of the vibration of the control object.

4. The vibration reducing device according to claim 1, wherein the actuator is arranged between a mounting surface for the control object and the control object, and stretches in an axial direction of the control object corresponding to an applied voltage.

5. The vibration reducing device according to claim 3, wherein the actuator controls one or more of the acceleration, velocity, displacement and sound pressure of the vibration of the control object.

6. The vibration reducing device according to claim 1, further comprising:
    an output-side bandpass filter that allows signals in the passband having frequencies above the Nyquist frequency of the digital controller, from the analog signals converted by the D/A conversion means, to pass; and
    the actuator applies vibration to the control object on the basis of the analog signal that has passed through the output-side bandpass filter.

7. The vibration reducing device according to claim 1, further comprising:
    a low frequency bandwidth control part, which contains an input-side low-pass filter that allows vibration having frequencies below the Nyquist frequency of the digital controller from the vibration detected by the vibration state detection device to pass, converts the analog signal that has passed through the input-side low-pass filter into a digital signal, converts a feedback control signal determined on the basis of the digital signal from a digital signal into an analog signal, and on the basis of the analog signal, applies vibration to the control object by the actuator.

8. The vibration reducing device according to claim 1, further comprising:
    a second input-side bandpass filter, having a passband that is narrower than the frequency range from the Nyquist frequency to the sampling frequency and contains no frequencies that are an integer multiple of the Nyquist frequency of the digital controller, wherein the passband of the second input-side bandpass filter overlaps the passband of the input-side bandpass filter,
    wherein the analog signal that has passed the second input-side bandpass filter is converted into a digital signal; and
    wherein the feedback control signal determined on the basis of the digital signal is converted from a digital signal into an analog signal, and on the basis of the analog signal, vibration is applied by the actuator to the control object.

9. The vibration reducing device according to claim 8, wherein the control object is a fuel injector of an internal combustion engine, and the passband of the second input-side bandpass filter contains the vibration peaks of the fuel injector.

10. A method of reducing the vibration of a control object by a digital controller, the method comprising:
    detecting the vibration of the control object with a vibration state detection device;
    passing the vibration through an input-side bandpass filter, which has a passband that is narrower than a frequency range from a Nyquist frequency of the digital controller to a sampling frequency, and that contains no frequencies that are an integer multiple of the Nyquist frequency of the digital controller;
    converting the analog signal that has passed through input-side bandpass filter into a digital signal;
    converting a feedback control signal, determined by the digital controller on the basis of the digital signal, from a digital signal into an analog signal; and
    applying vibration to the control object on the basis of the analog signal.

11. The method according to claim 10, wherein the control object is a fuel injector of an internal combustion engine, and wherein the frequencies of the vibration peaks of the fuel injector fall within the passband of the input-side bandpass filter.

12. The method according to claim 10, further comprising:
detecting one or more of the acceleration, velocity, displacement and sound pressure of the vibration of the control object.

13. The method according to claim 10, further comprising:
arranging the actuator between a mounting surface for the control object and the control object; and
stretching the actuator in an axial direction of the control object with an applied voltage.

14. The method according to claim 12, further comprising:
controlling one or more of the acceleration, velocity, displacement and sound pressure of the vibration of the control object with the actuator.

15. The method according to claim 10, further comprising:
passing the analog signal through an output-side bandpass filter that allows signals in the passband having frequencies above the Nyquist frequency of the digital controller; and
applying the vibration to the control object on the basis of the analog signal that has passed through the output-side bandpass filter.

16. The method according to claim 10, further comprising:
passing the vibration detected by the vibration state detection device through a low frequency bandwidth control part, which contains an input-side low-pass filter that allows vibration having frequencies below the Nyquist frequency of the digital controller to pass;
converting the analog signal that has passed through the input-side low-pass filter into a digital signal;
converting a feedback control signal determined on the basis of the digital signal from a digital signal into an analog signal; and
applying vibration to the control object by the actuator on the basis of the analog signal.

17. The method according to claim 10, further comprising:
passing the vibration detected by the vibration state detection device through a second input-side bandpass filter, having a passband that is narrower than the frequency range from the Nyquist frequency to the sampling frequency and contains no frequencies that are an integer multiple of the Nyquist frequency of the digital controller, wherein the passband of the second input-side bandpass filter overlaps the passband of the input-side bandpass filter,
converting the analog signal that has passed the second input-side bandpass filter into a digital signal; and
converting the feedback control signal determined on the basis of the digital signal from a digital signal into an analog signal; and
applying vibration to the control object by the actuator on the basis of the analog signal.

18. The method according to claim 17, wherein the control object is a fuel injector of an internal combustion engine, and the passband of the second input-side bandpass filter contains the vibration peaks of the fuel injector.

\* \* \* \* \*